(12) United States Patent
Beck (10) Patent No.: US 8,972,068 B2
(45) Date of Patent: Mar. 3, 2015

(54) OPERATION OF A POWER GENERATOR IN A POWER SUPPLY NETWORK

(75) Inventor: Bernhard Beck, Volkach OT Dimbach (DE)

(73) Assignee: Adensis GmbH, Dresden (DE)

( * ) Notice: Subject to any disclaimer, the term of this patent is extended or adjusted under 35 U.S.C. 154(b) by 642 days.

(21) Appl. No.: 13/313,610

(22) Filed: Dec. 7, 2011

(65) Prior Publication Data

US 2012/0150358 A1 Jun. 14, 2012

(30) Foreign Application Priority Data

Dec. 11, 2010 (DE) .......................... 10 2010 054 233

(51) Int. Cl.
| | |
|---|---|
| G06G 7/635 | (2006.01) |
| G06Q 50/06 | (2012.01) |
| H02J 3/00 | (2006.01) |
| H02J 3/14 | (2006.01) |
| G06F 1/26 | (2006.01) |

(Continued)

(52) U.S. Cl.
CPC . *H02J 3/16* (2013.01); *H02J 3/383* (2013.01); *H02J 3/386* (2013.01); *Y02E 10/563* (2013.01); *Y02E 10/763* (2013.01); *Y02E 40/34* (2013.01)
USPC ............ 700/286; 700/287; 700/297; 700/298

(58) Field of Classification Search
CPC ........... G06G 7/635; G06Q 50/06; H02J 3/00; H02J 13/00086; H02J 3/14; H02J 3/382; Y02E 10/723; Y02E 10/72; F03D 7/048; G06F 1/26
USPC .................................. 700/286, 287, 297, 298
See application file for complete search history.

(56) References Cited

U.S. PATENT DOCUMENTS

| | | | | |
|---|---|---|---|---|
| 7,203,622 | B2 * | 4/2007 | Pan et al. ...................... | 702/184 |
| 7,392,114 | B2 * | 6/2008 | Wobben ........................ | 700/286 |
| 7,447,568 | B2 * | 11/2008 | Christensen et al. ......... | 700/298 |

(Continued)

FOREIGN PATENT DOCUMENTS

| | | |
|---|---|---|
| DE | 100 20 635 A1 | 3/2001 |
| DE | 199 61 705 A1 | 7/2001 |

(Continued)

OTHER PUBLICATIONS

"TransmissionCode 2007; Network and System Regulations of German Transmission System Operators"; Version 1.1, Aug. 2007—Publisher: Verband der Netzbetreiber [Association of Network Operators]—VDN—e.V. at VDEW [German Electricity Association].

*Primary Examiner* — Ronald Hartman, Jr.
(74) *Attorney, Agent, or Firm* — Muncy, Geissler, Olds and Lowe, P.C.

(57) ABSTRACT

During operation of at least one power generator (EE) in a power supply network, a reactive power transfer between the two upper voltage levels (1, 2) is sensed at a first transformer (T1) connecting these levels, and the voltage at a first network connection point (5) at the lowest voltage level (3) is ascertained. The amount of a reactive power demand served by the power generator (EE) is calculated as a function of the ascertained voltage value in order to maintain the voltage ascertained at the lowest voltage level (3) within a predefinable voltage range, wherein a means (WR) of the power generator (EE) is activated for a reactive power draw or a reactive power delivery, based on the calculated reactive power demand.

10 Claims, 3 Drawing Sheets

(51) Int. Cl.
*H02J 3/16* (2006.01)
*H02J 3/38* (2006.01)

(56) References Cited

U.S. PATENT DOCUMENTS

| | | | |
|---|---|---|---|
| 7,557,457 B2 | 7/2009 | Richter et al. | |
| 7,680,562 B2* | 3/2010 | Delmerico et al. | 700/297 |
| 8,212,397 B2* | 7/2012 | Kaestle | 307/43 |
| 8,301,313 B2* | 10/2012 | Wobben | 700/297 |
| 8,692,419 B2* | 4/2014 | Fortmann et al. | 307/153 |
| 2005/0042098 A1* | 2/2005 | Wobben | 416/132 B |
| 2007/0114796 A1 | 5/2007 | Garces et al. | |
| 2008/0252143 A1* | 10/2008 | Llorente Gonzalez et al. | 307/47 |
| 2010/0094474 A1 | 4/2010 | Larsen et al. | |
| 2011/0273129 A1* | 11/2011 | Coe et al. | 320/101 |
| 2013/0138260 A1* | 5/2013 | Divan et al. | 700/298 |

FOREIGN PATENT DOCUMENTS

| | | |
|---|---|---|
| DE | 101 36 974 A1 | 11/2002 |
| DE | 10 2004 048 339 A1 | 4/2006 |
| EP | 1 508 951 A1 | 2/2005 |
| EP | 1 841 037 A2 | 10/2007 |
| EP | 1 892 412 A1 | 2/2008 |

\* cited by examiner

OPERATION OF A POWER GENERATOR IN A POWER SUPPLY NETWORK

This nonprovisional application claims priority under 35 U.S.C. §119(a) to German Patent Application No. DE 10 2010 054 233.4, which was filed in Germany on Dec. 11, 2010, and which is herein incorporated by reference.

The invention concerns a method and a device for operating at least one power generator, which in particular is implemented as a regenerative power generator, in a power supply network with voltage levels connected through a first and a second transformer. The voltage levels of different magnitudes are, for example, three linked voltage levels, the upper two voltage levels of which are connected to one another through a first transformer, and the lower two voltage levels of which are connected to one another through a second transformer.

In the practice of public power supply, the power suppliers or network operators set more or less narrow limits in the power supply network for current and voltage quality with respect to the reactive power component (reactive power draw or reactive power delivery) on power suppliers and power consumers, represented by the cos phi value in the phasor diagram of current and voltage, as a function of supply level, which in Germany, for example, ranges from an ultra-high voltage level above 220 KV and/or a high voltage level at 33 KV to 220 KV through a medium voltage level between 1 KV and 33 KV to a low voltage level up to 1 KV. In many cases, including in Germany in particular, the permissible value of cos phi for penalty-free reactive power draw or reactive power injection is 0.95. This limit setting serves to stabilize the networks in order to avoid an overvoltage, which can result in destruction of connected loads, and to avoid an undervoltage, which can cause loads to fail. Price serves to regulate adherence to the cos phi values that have been set. Thus, an injection or a draw of reactive power outside of the range for cos phi specified by the power supplier or higher-level network operator is subject to substantial penalty charges or additional charges.

Systems for generating regenerative power are widely known. Every photovoltaic system (PV system) generates direct current, which must be converted into alternating current by means of an inverter, and is fed into a power supply network under suitable conditions. Both electronic devices and electromechanical converters can be employed as inverters. The term inverter here should be interpreted to mean all devices that can produce an alternating current from a direct current. Thus, although windpower systems directly generate alternating current, this must be adapted to the conditions of the public supply network (power supply network) through a frequency converter. These frequency converters also include inverters and should also be included in the category of means.

The electronic components of an inverter, as is also the case for the combination of a DC machine with a synchronous generator as a mechanical inverter, permit the establishment of a desired cos phi value with respect to power. In most PV systems, this is accomplished by means of a cos phi indicator, by means of which a fixed ratio of delivered power to delivered or drawn reactive power can be established. Thus, the control unit is required to set a cos phi value of 0.97 for all power delivered to the network.

Known from the published German patent application DE 199 61 705 A1, for example, is an inverter for a photovoltaic system by means of which a solar installation can be connected to a power supply network, and which has a control unit for dynamically calculating a compensation current to compensate harmonics and reactive power in the network. The intent is to improve the network voltage quality in the power supply network through operation of the inverter with the control unit. The control unit calculates a desired compensation current value based on a measured network voltage value. In this design, the measuring element for the network voltage element is arranged at the connection point where the inverter delivers the power to the network.

Figure 1:
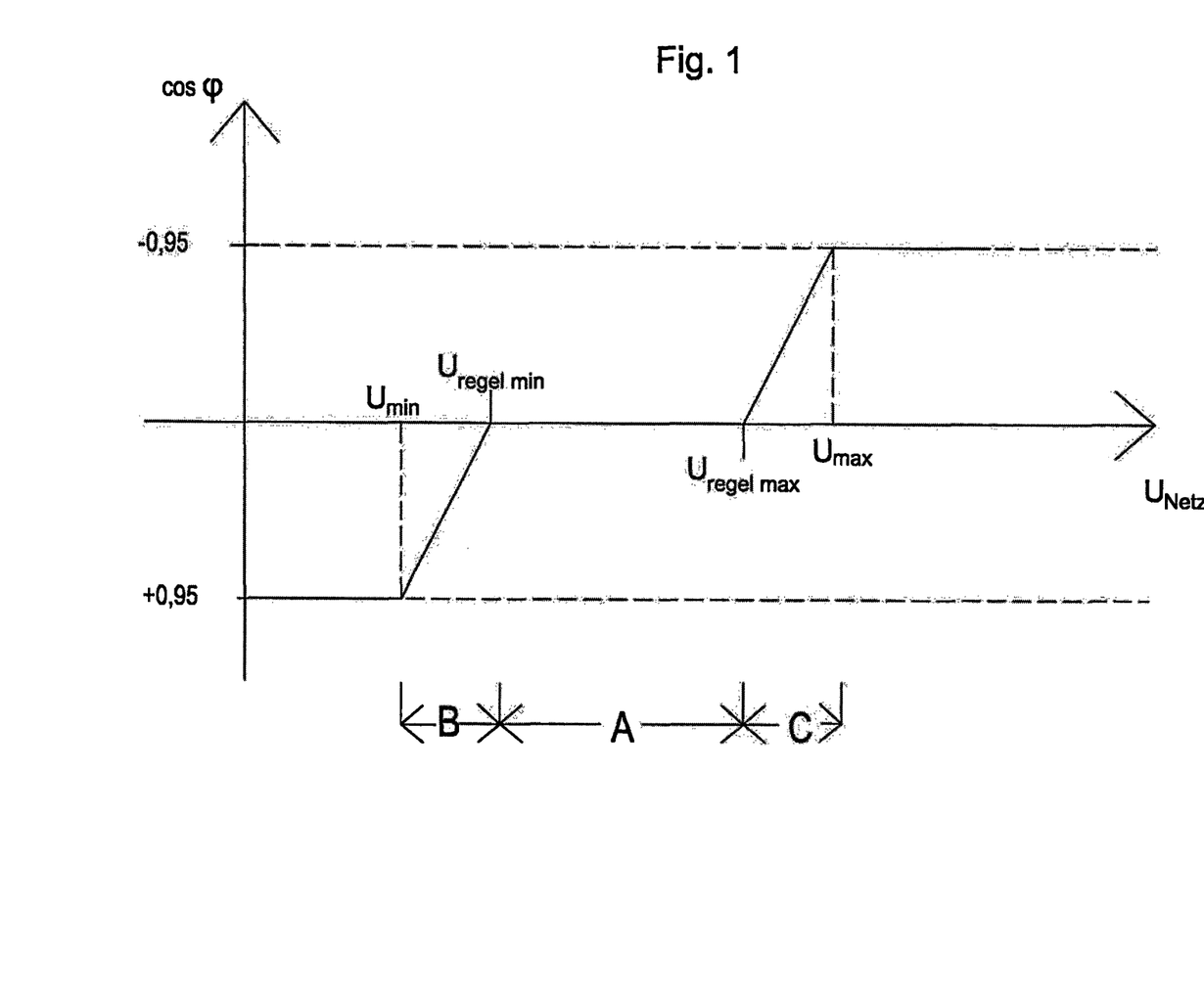
FIG. 1 a regulation scheme for an inverter of a solar installation to establish a cos phi value through the output voltage.

In relatively large and modern systems, the cos phi value is not necessarily fixed, but instead can be adjusted dynamically in operation using a diagram as shown in FIG. 1 depending on the instantaneous requirements. A cos phi value to be established at the output of the inverter is plotted as a function of network voltage there. The output voltage ($U_{Netz}$) for delivery to the network may only vary within a range between a minimum value ($U_{min}$) and a maximum value $U_{max}$. The PV system should not be operated outside this range permitted by the power supplier for delivery to the network with a maximum cos phi of, e.g., 0.95. Within this permissible range lies a narrower range between a minimum control voltage ($U_{regel\ min}$) and a maximum control voltage ($U_{regel\ max}$) in which pure power without a reactive power component can be supplied to the network. The nominal voltage ($U_{soll}$) lies in the center of this narrower range.

As a general rule power suppliers, particularly in their contractual relationship to the higher-level network operator (e.g., nuclear power plant, coal-fired power plant, etc.) as electricity vendor, are contractually obligated not to exceed a reactive power draw value of cos phi 0.95, in order to safeguard the voltage stability of the supraregional network. In the example, this means that a cos phi value of 0.94 represents an exceedance of draw, whereas a cos phi value of 0.96 represents a negative exceedance, which is to say an underutilization of the maximum permitted draw. A draw or delivery of reactive power is frequently necessary in the lower-level networks, however, in order to compensate for a voltage rise due to the feed-in of solar and wind power or to compensate for a voltage drop resulting from a dropout in the supply of alternative power generation or from the startup of machinery.

For a more detailed explanation of the problems and the object arising therefrom, an example is discussed with reference to FIG. 3. In a medium voltage supply network at 20 kV, multiple localities A through K of different sizes are supplied with power at an 0.4 KV level through a ring circuit 17 that is connected to two supplying transformers 19 and 21. The localities A through K are supplied with stable power at the 0.4 KV level. Measures must be taken when one of the transformers, for example the transformer 21, goes offline because of maintenance work or failure and must be disconnected from the network. The remaining transformer 19 must then supply all localities A through K with power.

In order to be able to provide sufficient voltage even at the distant localities E and D, the control room responsible for the supply network must increase the output voltage at transformer 19. For the nearby localities A and K, this means that they are supplied at the upper edge of the desired voltage range. For the distant localities, this means that they are supplied closer to the lower edge of the voltage range. If a relatively large photovoltaic system is located in the locality K, then its control system will attempt to steer the PV system back into region B—as shown in FIG. 1 described above— since the system is being operated in the area of the right edge, which is to say in the region [sic]. Since the PV system controller is not aware of the offline transformer 21, the result is that the system controller will attempt to reduce the network voltage and the control room will attempt to raise the network voltage, for example by appropriate switching actions on the transformers, in particular by a change in the transformation ratio. These opposing interventions in the power supply network have already resulted in less stable networks on a regular basis, even before regenerative power generators were present at today's levels.

Based on these considerations, the object of the invention is to make a contribution to increasing supply stability in an electric power supply network.

This object is attained according to the invention by the means that a reactive power transfer between the two upper voltage levels is sensed at the first transformer, and the voltage at a first network connection point is ascertained at the lowest voltage level. The amount of reactive power demand served by a power generator of the power supply network is calculated as a function of the ascertained voltage value in order to maintain the voltage ascertained at the lowest voltage level within a predefinable voltage range. Based on the calculated reactive power demand, a means of the power generator is activated for a reactive power draw or a reactive power delivery.

The term network connection point is normally understood to mean the position of the meter between the load and the network, and between the supplier and the network. In the present case, this is additionally understood to mean any position within the public supply network and the network of the load and supplier at which the voltage measurement is performed.

In addition to the method, the invention also comprises a device for operating at least one power generator, which in particular is implemented as a regenerative power generator, in a power supply network having multiple voltage levels, the upper two voltage levels of which are connected through a first transformer, and the lower two voltage levels of which are connected through a second transformer. The power generator is connected to the lowest voltage level through a first network connection point or through another network connection point, or is connected to the middle voltage level through a second network connection point. A measuring device senses the reactive power transfer between the two upper voltage levels at the first transformer. A voltage measuring device ascertains the voltage at a first network connection point at the lowest voltage level. A computing device calculates the amount of a reactive power demand served by the power generator as a function of the voltage value ascertained by the voltage measuring device in order to maintain the voltage ascertained at the lowest voltage level within a predefinable voltage range. A regulating and/or control unit (13) is provided for this purpose and is configured to activate a means of the power supplier for a reactive power draw or a reactive power delivery based on the calculated reactive power demand.

The method and the device are useful for reactive power management at the supply level with the goal of the most balanced possible voltage within the particular level being considered, in particular while maintaining a predefinable reactive power draw from the higher-level network (upper voltage level).

As a general rule, the means usually consists of an electronic or electromechanical inverter. Because of the components that are inherently present, such as, e.g., IGBTs in the electronic inverters or an excitation current controller in a machine set, these devices have the capability of providing a reactive power contribution (VAr contribution).

Thus, a capability of the devices that is present in any case is used for an additional purpose, namely for stabilization of the supply network. In general, this occurs with no losses in delivery of the real power. An inverter of, e.g., 1 MW (MVA) rated power, which is only loaded with 0.6 MVA because of the existing solar radiation, has a free capacity for injecting or drawing reactive power in the amount of 0.4 MVAr. In the case of the example described at the outset, this inverter can thus be operated with a capacitive cos phi corresponding to a reactive power injection, suspending its typical regulation scheme according to FIG. 1, in order to contribute to raising the voltage level. Typically, efforts would be made to stay within the control range of the inverter through a voltage reduction.

Preferably, the management of the inverter will maintain the maximum power point MPP of the photovoltaic system or windpower system by means of the control system inherent therein. In addition, the inverter should feed into or draw from the supply level a quantity of reactive power that at a maximum corresponds to the difference between the power currently being delivered and the rated power of the inverter. In this way, the reactive power contribution is limited to the power remaining to achieve the rated power of the inverter, so that the power generated by the power generator itself is not limited or reduced. The free output capacity of the inverter is merely used to fulfill an additional function, namely that of a phase shifter or reactive power supplier.

Provision can also be made for the management of the inverter to provide for feeding into or drawing from the supply level a predefinable reactive power component up to the maximum power point MPP while bypassing the required suspension of the control system. This is advantageous when prevailing network conditions make it more useful for the system operator to provide reactive power for stabilizing the network than to provide real power for driving machines or operating air conditioners, etc.

An especially suitable location for placement of the voltage measuring device is at the end of a branch circuit, or in the center of a ring circuit with respect to a supply transformer feeding the ring circuit, or when there are multiple feeding transformers in the vicinity of said transformers. This is where the loads are located that, in the normal direction of draw in the network, have the lowest network voltage available when one of the transformers goes offline, for example for maintenance work. When a power generator or supplier is not nearby, the available voltage is generally lowest there because of the other loads located ahead of these loads, which bring about a marginal voltage drop.

The terms "at the end of a branch circuit and in the center of a ring circuit with respect to a supply transformer feeding the ring circuit" should be interpreted as being relative in this context. For example, if a branch circuit with two hundred (200) connection points is present, then the end should be considered to be one of the last 10% of connection points, which is to say one of the last twenty (20) connection points. Analogously, for a ring circuit with two hundred (200) connection points, each of the ten (10) connection points to the left and right of the transformer connection points would be considered connection points.

In general, the most voltage-sensitive network connection point is chosen, in particular under the hypothesis of a transformer failure. This may also be another location, for example when a load is provided there that operates heavy machinery with high startup current that is switched on and off frequently on a daily basis. Alternatively, the load with the widest range of variation in reactive power draw is ascertained, while the measurement of the voltage value takes place at the network connection point of this load.

Generally speaking, the most voltage-sensitive point is characterized by the highest voltage variation with regard to electric power to be delivered or drawn. Moreover, the voltage variation can be defined by a percentage change and not by the absolute voltage values observed. In the presence of a ring circuit, this is frequently in the center with respect to the transformer to the next higher network, which is to say at the point where the distance from the transformer is the same in both directions.

The management of the inverter is characterized in that a measured undervoltage below a threshold results in an infeed of reactive power on the part of the inverter. An imminent overvoltage, for example when an upper threshold value is reached, results in a reactive power draw by the at least one inverter.

A wider monitoring of the voltage state on the network of the supply level provides for the voltage to be ascertained at the network connection points of multiple loads on the same supply level, and for management to take place using the corresponding multiple voltage values. Thus, with knowledge of multiple sensitive locations, and also in particular with the presence of multiple regenerative power generators at connection points that are more widely separated geographically, optimal management of the network state can be achieved.

When multiple power generators of regenerative energy are present, each with its associated network connection point, in the same supply network, it is useful for the reactive power component that is to be supplied to be distributed among the corresponding multiple inverters in such a manner that the participating inverters operate with the lowest possible total loss. The characteristic of low loss is to be understood in this context to mean that the largest possible quantity of kilowatt hours can be fed into the network from the regenerative energy supply, for example sun or wind. This permits an efficient utilization of the available reactive power capacities. For the same reason, it is appropriate that the particular power generator is used by preference for reactive power injection or reactive power draw that is spatially adjacent to the network connection point at which the voltage value that is approaching a critical value is ascertained.

In order to protect the inverter and the photovoltaic system, the control device has a limiter that applies the predefined reactive power quantity reduced in such a manner that a maximum permissible voltage at the output of the inverter is not exceeded. In like manner, it can be useful to provide the control device with the capability of applying the predefined reactive power quantity increased in such a manner that a minimum permissible voltage at the input of the inverter is not negatively exceeded.

In a suitable manner, the control system contains a control algorithm that maintains the reactive power transfer below a predetermined limit value.

An energy storage system, which can consist of a battery bank, may also be considered a power supplier. A pumped storage power plant or the like is also possible. This energy storage system can then draw power, or also reactive power, from the relevant voltage level or feed it into the voltage level on request.

It can be useful for the energy storage system or at least one of the power suppliers to feed reactive power into the lowest voltage level while at the same time a different power supplier or a different energy storage system draws reactive power from the [same] voltage level. This depends on the geographic proximity of the power generator or power supplier to the loads. It is likewise useful for the energy storage system or at least one of the power generators to feed reactive power into one of the two lowest voltage levels while at the same time a different power generator or a different energy storage system draws reactive power from one of the two voltage levels.

In like manner, a possible management may provide for a signal to be generated that results in a power reduction at the power supplier in favor of a reactive power delivery when there exists a maximum permissible reactive power transfer, a maximum possible reactive power delivery from the at least one power supplier and from the energy storage system that is provided if applicable, and a measured voltage value at the edge of the predefinable voltage range. The loss of power here is to be accepted in favor of reactive power compensation.

Below, an exemplary embodiment of the invention is explained in detail with reference to the drawings. They show.

Shown in FIG. 1 is a scheme for regulating the cos phi through the inverter output voltage U; this scheme is used to advantage principally in modern PV systems, and is intended to facilitate understanding of the description below.

Two limit values $U_{min}$ and $U_{max}$ are provided, which generally should not be exceeded either negatively or positively. Located between these boundary limit values $U_{min}$ and $U_{max}$ is a linear control range A, which is delimited by two control limit values $U_{regel\ min}$ and $U_{regel\ max}$. In this region A, the installation is operated in a cos phi neutral manner, and solely real power is fed into the supply network. If the operating point of the inverter is located with its output voltage U in the range B between $U_{min}$ and $U_{regel\ min}$, then reactive power VAr (reactive amperes) is additionally delivered to the supply network.

In similar fashion, for an operating point of the inverter with an output voltage U in the range C between $U_{max}$ and $U_{regel\ max}$, reactive power VAr is drawn from the supply network in addition to the feed-in of power. In this context, the operating point can be adjusted by means of semiconductor elements or switches, in particular IGBTs (Insulated Gate Bipolar Transistors) in the inverter, in particular by means of a so-called MPP controller (Maximum Power Point). At the upper and lower limit values, there are also emergency edges which are not discussed further here.

Thus, depending on the operating point, a reactive power draw from the network occurs under certain circumstances, which in general means a tendency to reduce the network voltage, or else a reactive power injection, which is equivalent to an increase in voltage at the supply level at which the inverter is connected.

Figure 2:
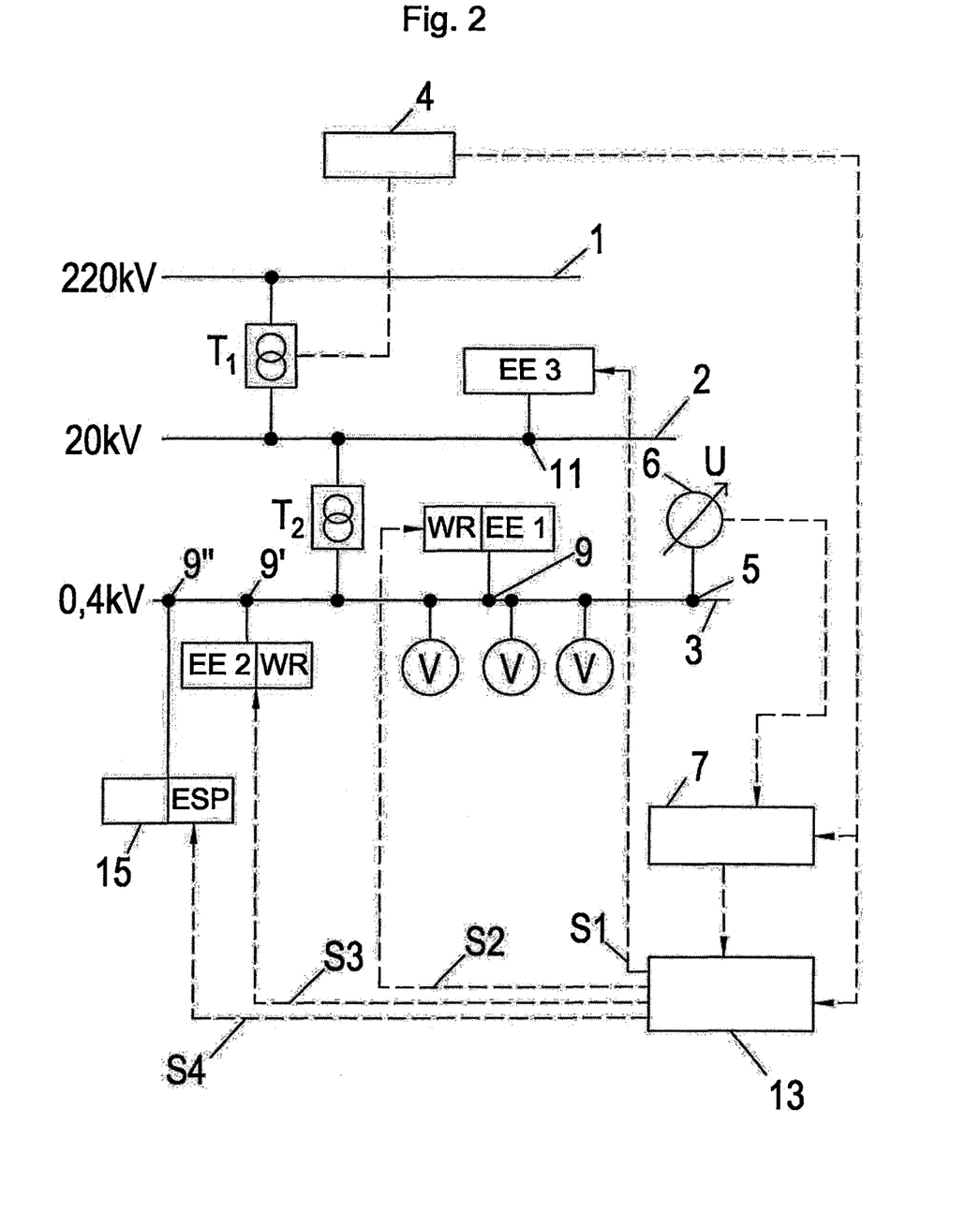
FIG. 2 a schematic representation of three supply levels with their participating components.

FIG. 2 shows three voltage or supply levels 1, 2, 3 of an electric power supply network. The supply level 1 is a high voltage level with 220 kV, the supply level 2 is a medium voltage level with 20 kV, and the supply level 3 is a low voltage level with 400 volts. A first transformer T1 steps the high voltage down to the medium voltage. A second transformer T2 steps the medium voltage down to the low voltage. Connected to the first transformer T1 is a measuring device 4, which senses the reactive power transfer between the two upper voltage levels 1, 2 at the first transformer T1. The ascertained value of the reactive power transfer is ascertained at a computing unit 7, which will be discussed in detail below. The goal of reactive power management for the supply level 1 is not to fall below a predefinable cos phi limit value, for example a cos phi of 0.95, at this location.

At a first network connection point 5, the voltage prevailing at this point on the low voltage level 3 is measured by means of a voltage measuring device 6. The corresponding measured value is routed to the computing device 7 through a signal line. In FIG. 2, signal lines are represented with dashed lines, while power flow lines are represented with solid lines.

A first power generator EE1, hereinafter also referred to as a power supplier, is connected to the lowest voltage level 3 by a different network connection point 9. The first power generator EE1 is a photovoltaic system (PV system) with an inverter WR that transforms the direct current that is generated into alternating current. The photovoltaic system can be an ordinary roof-mounted system, of which a plurality (only a second power supplier or power generator EE2 is shown) are connected by a corresponding plurality of different network connection points 9' to the lowest voltage level 3.

The first network connection point 5, to which the voltage measuring device 6 is connected, can also simultaneously be a feeding point for one of the power generators EE. In addition to or instead of the first power generator EE1, a different power generator or power supplier EE3 can be connected to the middle voltage level 2 through a second network connection point 11 that is located at the middle voltage level 2. The power generators EE1 through EE3 share the feature that they can service a reactive power demand upon request or upon demand. In other words, the power generators EE1 through EE3 have the technical capability of supplying or drawing reactive power (VAr) through the connection point 9, 9' at the applicable supply level 2, 3.

The computing device 7 ascertains the amount of reactive power demand that is necessary to maintain the voltage ascertained at the lowest voltage level 3 within a predefinable voltage range as a function of the voltage value ascertained by the voltage measuring device 6. In this process, it is necessary to respect adherence to the maximum permissible value of the reactive power transfer taking place at the first transformer T1. If the measured voltage U at the first network connection point 5, for example, is near the lower limit of the predefined voltage range, then reactive power VAr must be supplied to the voltage level 3 in order to raise the voltage.

In the reverse case, when the measured voltage is near the upper limit of the voltage range, then reactive power VAr must be removed from the voltage level. The magnitude of the reactive power VAr to be drawn or removed is ascertained in the computing device 7 and forwarded to a regulating and control unit 13. This unit generates one or more output signals S1 through S3, which influence(s) the means of the power generator EE1 through EE3 responsible for the reactive power draw or reactive power infeed. In photovoltaic systems as the power generator EE, this means is the inverter WR inherent thereto, which is capable of generating or accepting reactive power VAr within the scope of its rated power by driving the built-in IGBTs appropriately. In the case of mechanical inverters WR, this means is the setting of the excitation current of the machines involved.

Also shown in FIG. 2 is an energy storage system 15, which can be provided at one of the voltage levels 1 through 3 by means of a separate network connection point 9'' in order to draw reactive power VAr from the voltage level 3 or to feed it into the voltage level 3. In the present case, the energy storage system 15 is connected to the lowest voltage level 3, although it is also possible to provide this energy storage system at the middle voltage level 2. The energy storage system 15 likewise obtains its control signal S4 from the regulating and control unit 13. The possibility also exists for the energy storage system 15 or at least one of the power generators EE1 or EE2 to supply reactive power VAr to the lower voltage level 2, while at the same time a different power generator EE3 or a different energy storage system draws reactive power from another voltage level. The energy storage system 15 can be an apparatus that is known per se, such as, e.g., a battery bank, a pumped storage power plant, or a combination of different types of energy storage systems.

Figure 3:
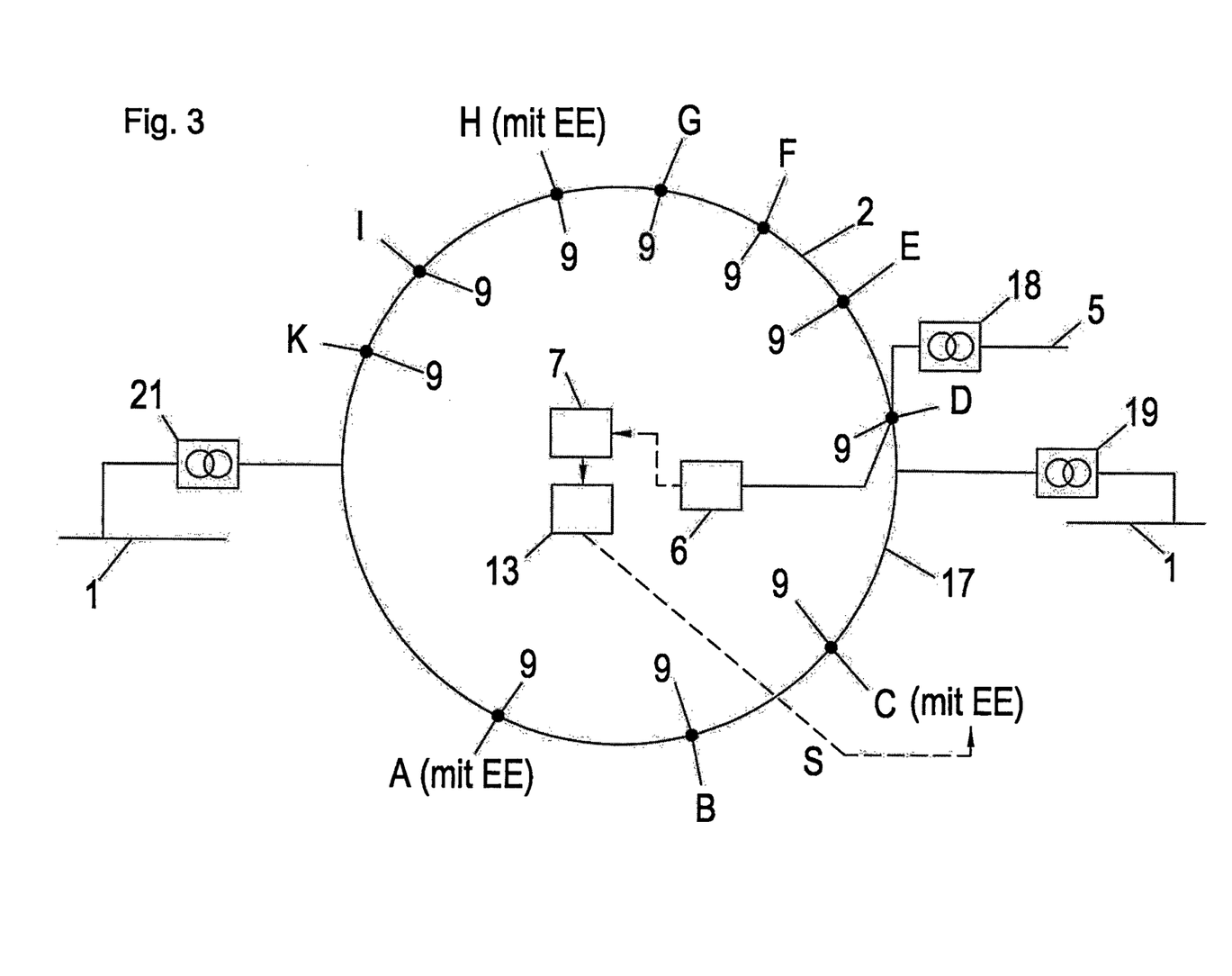
FIG. 3 a ring circuit with supply transformers and network connection points.

Shown in FIG. 3 is a ring circuit 17 on the medium voltage level 2, to which are connected a number of localities A through K in which the voltage is brought to the low voltage level 3 by additional transformers, of which only the one from the locality D is shown and is labeled with the reference character 18. Relatively large photovoltaic systems, which are connected to the ring circuit 17 through associated network connection points, are installed in the localities A, C, and H. At the high voltage level 1, the ring circuit 17 is supplied with electric power through two supply transformers 19 and 21.

For the purpose of illustration in an example application, it should be assumed that the transformer 19 is undergoing maintenance and is removed from the network. In consequence, only one voltage level at the lower end of the rated voltage of, e.g., 20 kV would still be available to the localities E and D fed by the remaining supply transformer 21. The lower end is considered to be a value of, for example, 3% below the rated voltage, which is to say 19.4 kV in the present case. As a result, the switching on of a piece of heavy machinery in the locality F would cause a drop below the minimum voltage, and cause the lights in the localities E and D to flicker. This imminent condition is detected by a voltage measuring device 6, which is connected at a network connection point 5, by means of which the locality D is supplied with electric power.

The network connection point 5 is located on the secondary or low voltage side of the other transformer 18 of the locality D, which is to say on the 0.4 kV voltage level 3. The measured voltage value is supplied to a computing device 7, which calculates therefrom a value of reactive power delivery for raising the voltage at the network connection point 5. This requirement is forwarded to a regulating and control unit 13, which produces from it a signal S, which is forwarded to at least one power supplier EE. In the exemplary embodiment, this is the large-scale photovoltaic system in the locality C, which is closest to the geographic point where the voltage increase is desired, which is to say the locality D. The photovoltaic system there is then set in such a manner that power capacities of the inverter WR that are not currently needed for solar energy conversion, which is to say free power capacities, can be called upon to deliver reactive power. The possible supply contribution here corresponds to the difference between the generated power P and the rated power of the inverter WR. If the power generator EE located there should happen to be feeding its rated power into the network at that time, so that no additional reactive power VAr can be fed in, it may be desirable to reduce the power P in favor of a reactive power delivery. In the event that multiple power generators EE are present, the one that should be induced to reduce power is the one whose contribution to voltage stabilization is the most effective, which is to say the photovoltaic system in the locality C in the example shown.

In general it is the case that the power generator EE with the most effective contribution is the one located closest to the most voltage-sensitive place, or at the end of a branch circuit, or close to the center of a ring circuit. In this context, the most voltage-sensitive place is defined by a percent deviation with respect to the rated voltage of the supply level in question. The most voltage-sensitive place depends on the circumstances at the location, which is to say what industrial facilities are located in which localities A through K and/or what conductor cross-sections have been installed, etc. This place is ascertained through observation of the measured voltage values over a relatively long operating period.

Even though only a single network connection point 5 with the connected voltage measuring device 6 is shown for the sake of clarity, a plurality of voltage measuring devices 6 can be present at different places in the network levels 2 and/or 3 in question in order to acquire a voltage diagram of the entire network region and to determine therefrom the amount of the reactive power demand and the most suitable power generator EE for reactive power delivery. Not just one reactive power delivery may be necessary here to raise the voltage. In addition, a reactive power draw to reduce the voltage may also be useful at a different location in the network.

To stabilize the voltage on the ring 17 during maintenance of the transformer 19 that has been taken off the network, it is customary to change the transformation ratio of the remaining transformer 21 at the same time. The then higher voltage at its network feed point is looped through to locality D and counteracts the imminent voltage drop below the minimum value. As a result, an undesirable voltage increase can occur at the localities A and K adjacent to the transformer 21, which can be compensated for by a reactive power draw on the part of the power generator EE sited in the locality A.

If a branch circuit should adjoin the additional transformer 18, then it is useful for the voltage measuring device 6 to be placed at the end of the branch circuit, preferably at the network connection point of the last load, especially since the lowest voltage is to be expected there.

LIST OF REFERENCE CHARACTERS

1 highest voltage level
2 middle voltage level
3 lower voltage level
4 reactive power measuring instrument
5 first network connection point
6 voltage measuring device
7 computing device
9, 9', 9" network connection point
11 second network connection point
13 regulating and control unit
15 energy storage system
17 ring circuit
18 transformer of locality D
19 first supply transformer
21 second supply transformer
EE power generator
V load
P power
VAr reactive power
T1 first transformer
T2 second transformer
WR inverter
A-K localities
S, S1, S2, S3, S4 output signal

The invention claimed is:

1. A device for operating at least one power generator in an electric power supply network with voltage levels connected through a first and a second transformer, wherein the power generator is connected to a lowest voltage level or to a middle voltage level through a network connection point, the device comprising:
    a measuring device, which senses a reactive power transfer between two upper voltage levels at the first transformer;
    a voltage measuring device, which ascertains a voltage at a first network connection point at the lowest voltage level;
    a computing device, which calculates an amount of a reactive power demand served by the power generator as a function of a voltage value ascertained by the voltage measuring device in order to maintain a voltage ascertained at the lowest voltage level within a predefinable voltage range; and
    a regulating and control unit, which activates a power supplier for a reactive power draw or a reactive power delivery based on the calculated reactive power demand.

2. The device according claim 1, wherein the regulating and control unit contains a control algorithm that maintains the reactive power transfer below a predetermined limit value.

3. The device according to claim 1, further comprising with an energy storage system connected to one of the voltage levels, the system drawing power from a relevant voltage level or feeding it into a voltage level on request from the computing device.

4. The device according to claim 1, further comprising an energy storage system connected to one of the voltage levels, the system drawing reactive power from a relevant voltage level or feeding it into a voltage level.

5. The device according claim 1, wherein the power supplier comprises electronic components of an inverter or IGBTs (Insulated Gate Bipolar Transistor).

6. A method for operating at least one power generator in an electric power supply network with multiple voltage levels, wherein the power generator is connected to one of the voltage levels through a network connection point, the method comprising:
    sensing a reactive power transfer between two upper voltage levels at a first transformer connecting them;
    ascertaining a voltage at a first network connection point of a lowest voltage level;
    calculating an amount of a reactive power demand served by the power generator as a function of an ascertained voltage value in order to maintain a voltage ascertained at a lowest voltage level within a predefinable voltage range; and
    activating the power generator for a reactive power draw or a reactive power delivery, based on the calculated reactive power demand.

7. The method according to claim 6, wherein, in the event that multiple power generators are present, the one that is induced to reduce power is the one whose contribution to voltage stabilization is the most effective.

8. The method according to claim 6, wherein the management of an inverter of the power generator, maintains a maximum power point of photovoltaic or windpower systems by a control system of the inverter for a reactive power draw or a reactive power delivery, and wherein the inverter additionally feeds into, or draws from, a supply level a quantity of reactive power that at a maximum corresponds to a difference between a power currently being delivered and a rated power of the inverter.

9. The method according to claim 6, wherein reactive power is delivered from an energy storage system or from at least one of the power generators into one of two lower voltage levels while at the same time reactive power is drawn from one of two lower voltage levels by a different power generator.

10. The method according to claim 6, wherein a signal is generated by a regulating and control unit when there exists a maximum permissible reactive power transfer, or a maximum possible reactive power delivery or maximum possible reactive power draw from the at least one power generator, and from an energy storage system, if applicable, and when there exists a measured voltage value at an edge of the predefinable voltage range, and wherein the signal results in a power reduction at the power generator in favor of a reactive power delivery or a reactive power draw.

* * * * *